United States Patent [19]

Schleifenbaum

[11] 4,253,763

[45] Mar. 3, 1981

[54] REPROGRAPHIC CAMERA

[75] Inventor: Karl Schleifenbaum, Haiger, Fed. Rep. of Germany

[73] Assignee: Meteor-Siegen Apparatebau, Siegen, Fed. Rep. of Germany

[21] Appl. No.: 76,088

[22] Filed: Sep. 17, 1979

[30] Foreign Application Priority Data

Sep. 29, 1978 [DE] Fed. Rep. of Germany ....... 2842479

[51] Int. Cl.³ .................... G03B 27/34; G03B 27/40; G03B 27/70
[52] U.S. Cl. ........................................ 355/57; 355/58; 355/66
[58] Field of Search ...................... 355/57, 58, 65, 66

[56] References Cited

U.S. PATENT DOCUMENTS

| | | | |
|---|---|---|---|
| 3,146,661 | 9/1964 | Young | 355/58 X |
| 3,215,034 | 11/1965 | Woodcock | 355/58 X |
| 3,901,593 | 8/1975 | Kogiso et al. | 355/58 X |

Primary Examiner—Richard A. Wintercorn
Attorney, Agent, or Firm—Trexler, Wolters, Bushnell & Fosse, Ltd.

[57] ABSTRACT

A reprographic camera is described having a table for an original subject, an objective and an image frame. One of these parts is fixed and the others are relatively movable to produce variable scale images or reproductions of the original. The movable parts are coupled via a transmission member which gradually changes the ratio of the lengths of their displacements throughout their ranges of movement.

13 Claims, 4 Drawing Figures

REPROGRAPHIC CAMERA

The invention relates to a reprographic camera with a table for the original subject, an objective and an image frame, which are movable relatively to one another in order to produce images or reproductions of an original in a variable scale, one of these structural parts remaining in a fixed position.

Reprographic cameras of this type serve for the production of photographic negatives or even directly for the production of offset printing foils, which are for example used in the production of brochures, catalogues and other advertising material. It is frequently necessary for such purposes for the original to be reproduced to a different scale (reduced or enlarged). This can be accomplished in an optically simple manner by simultaneous changing of the subject distance and image distance. However, the relative changing of the distance between the subject and the image or reproduction does not in any way follow a simple linear function.

In principle, it is immaterial how one attains the relative positions between the table for the original, the objective and the image frame which are correct for the particular reproduction scale. Although these three structural components may all be constructed so as to be movable, generally one of the said components—usually the image frame—is held in a fixed position, and only the other two components (objective and subject table) are linearly displaced.

Accordingly, an apparatus of the type as initially discussed is known, with which firstly the subject table and secondly the objective are designed and arranged so as to be movable linearly. The displacement is effected by separate drive means and the particular position is indicated to the operator by means of a scale. For simplification purposes, the image-forming scale is in this case directly indicated. If this is to be changed, the subject table and the objective are so operated independently of one another that the scales indicate the same image-forming scale.

The independent alteration of the positions of, firstly, the subject table and, secondly, of the objective, is relatively complicated and time-consuming, but above all involves the danger of errors in adjustment. Consequently, the invention seeks to simplify the change in the image-forming scale on such a reprographic camera and also to produce automatically the required focused setting.

According to the invention, the two movable structural parts or components are coupled to one another by means of a transmission member, which gradually alters the ratio between the lengths of their displacements throughout their ranges of movement. In this way, it is possible, by independent displacement of the one component (for example, the table for the subject or original), to cause a dependent displacement of another component (for example, the objective) when the image frame is fixed, the distance covered in the course of the dependent movement being in a constantly changing ratio to the corresponding distance of the independent movement. The mathematical relationship between distances travelled is a function of the known optical laws.

With one preferred constructional form, the arrangement is so devised that the transmission member consists of a pivotable cam element, which is pivotable about its pivot through an angle of rotation which is linearly proportional to the displacement travel of the one movable structural part, and of which the peripheral radius is gradually altered between two end points. One end point has anchored thereon a traction member which is fixed at its other end on the other structural part, is wound onto or off the periphery of the cam element as the latter is pivoted and as a consequence displaces the other structural part against a force acting in the opposite direction.

Many forms of cam control means are known, which comprise cam elements having a radius varying over their periphery. In such cases, however, the difference in radius is introduced as a control path, which can be explored along the periphery as the cam element is rotated; for example, by means of a cam follower directed radially towards the axis of rotation of the cam element. If large control paths or travels are required, then the total difference in radius (between minimum and maximum radius of the cam element, related to its axis of rotation) has to be correspondingly large, which can quickly lead to cam elements which are no longer practicable or to the necessity of introducing gearing. By contrast, the arrangement as above described makes use of the actual peripheral difference, which is considerably larger than the difference in radius, so that larger control paths can also be produced with a relatively small cam element.

In the present case, the peripheral radius of the cam element increases gradually from a minimum at one end point to a maximum at the other end point, and the traction member is advantageously anchored at the end point with the smallest radius. In this way, the adaptation of the transmission of movement to the natural law concerning optics can be most easily and most accurately produced.

It is shown in practice that it may be expedient, for various reasons to correct the dependent follow-up control of the other structural part. In a preferred development of the invention, this is effected in a simple manner by the effective length of the traction member being variable.

One reason for such a correction may, for example, be that a three-dimensional object arranged on the subject table is to be reproduced, instead of a flat original, and consequently the sharply focused plane of the subject is to be altered in comparison to the surface of the said table. In accordance with one embodiment of a developed form of the invention, this is obtained by the traction member being led over a deflecting or reversing pulley, which is displaceable parallel to the pulling direction of at least one of its runs. However, the alteration in the length of the traction member can alo be produced in some other way, for example, by a tensioning pulley which shortens the effective length of the traction member and which deflects the latter. Finally, it is possible to provide a possibility of off-setting in the driving path between the one structural part and the transmission member, this being equivalent to changing the effective length of the traction member.

Another reason for the alteration may be that the true focal length of the objective does not conform to the nominal focal length. Due to such a deviation, however, the function which is "stored" in the transmission member (perhaps by the shaping of the cam element) between the travel of the one structural part and that travel of the other structural part which is dependent thereon is altered. It is then no longer done with a simple off-setting of the relative position of both structural parts, which off-setting is constant over the total path of displacement.

For achieving this object, the invention preferably provides for the traction member being fixed on the other structural part by way of a correcting member, which changes the effective length of the traction member by an amount which is dependent on the position of the other structural part. On account of the inevitably different variations in focal lengths, it is particularly advantageous if the alteration factor of the correcting member is variable.

With one preferred constructional form, the correcting member consists of a bellcrank lever pivotally mounted at its corner point on the other structural part one arm of said lever being connected at its free end to the traction member, while its other arm carries at its free end a pulley which runs on a guide rail which is adjustable with a swivelling action about a shaft fast with the camera with respect to the direction of movement of the other structural part. In this way, the alteration of the effective length of the traction member is changed through the path of displacement, such as that necessary with a focal length deviation. The guide rail may have any desired contour and make possible a suitable corrective function; however, it has been found in practice that a linear rail is fully adequate.

One constructional example of the invention is illustrated in the drawings wherein.

Figure 1:
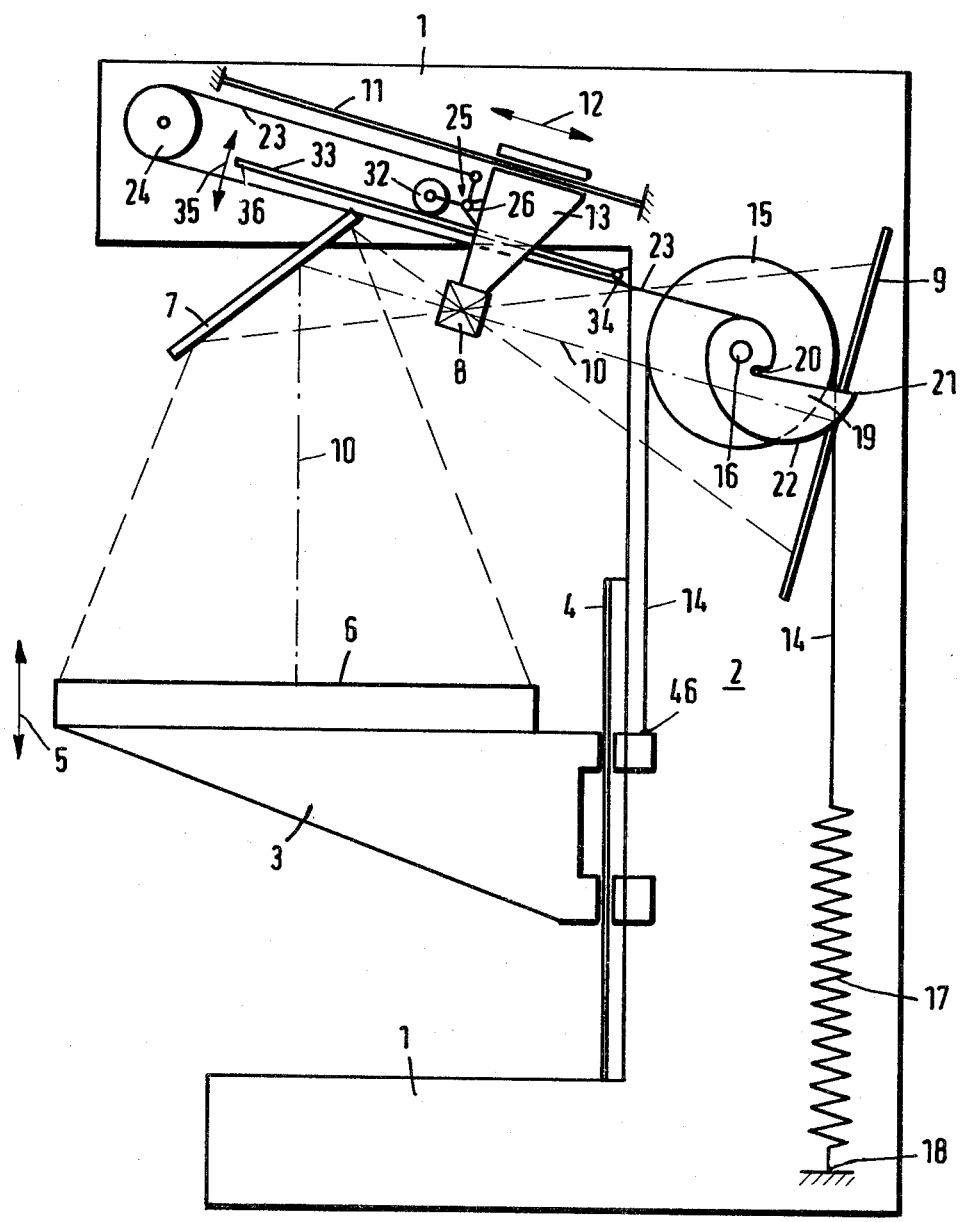
FIG. 1 is a diagrammatic functional representation of the reprographic camera according to the invention, in side elevation.
Figure 3:
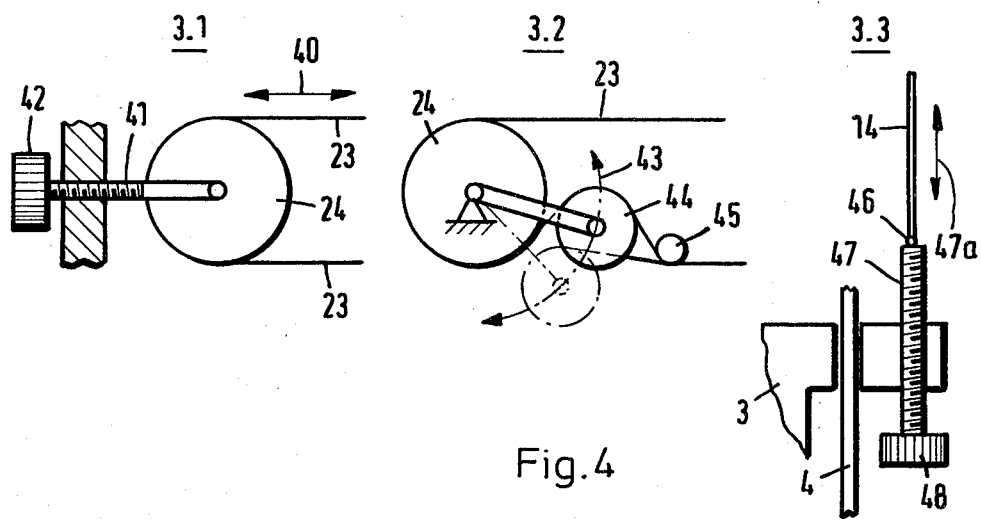
Figure 4:
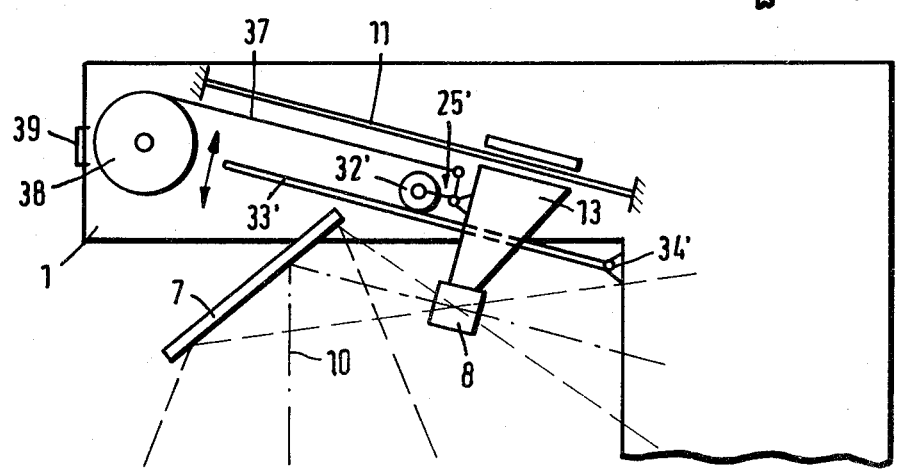

FIGS. 3.1, 3.2 and 3.3 are diagrams of three alternative constructional forms of the subject plane correction; and FIG. 4 is a detail of FIG. 1, showing the scale band for the reproduction scale and its focal length correction.

The reprographic camera which is shown diagrammatically in FIG. 1 comprises a stand-like housing 1 having upright pillars 2 on which a table 3 for the subject or original is movable up and down along a guide 4 in the direction of the arrow 5. Although the movement can be carried out manually, generally a motor drive will be provided. Flat originals or subjects can be arranged on the original plane 6 extending perpendicularly of the plane of the drawing. Alternatively even three-dimensional objects can be set up on said plane 6, which is illuminated by lamps which are not shown.

A mirror 7 deflects the light rays coming from the plane 6 into an objective 8, which projects and image of the original plane 6 on to the image frame 9. The optical axis bent to correspond to the path of rays is indicated at 10. The objective 8 is displaceable linearly (as shown by arrow 12) along a guide 11, which is fast with the camera. For this purpose the objective is seated on the free end of an objective support 13.

Fixed on the original table 3 is a chain 14 (or an equivalent traction member), which runs around a gear 15, which is mounted on a pivot shaft 16. The other end of the chain 14 is secured by means of a spring 17 and at 18 on the housing 1. Also mounted on the pivot shaft 16 is a cam element 19, of which the peripheral radius is gradually increased from a minimum at 20 and in a counterclockwise direction up to a maximum at 21. Correspondingly the length of the peripheral surface 22 per unit of angle of rotation becomes increasingly larger from the end point 20 to the end point 21. Fixed near the end point 20 with minimum peripheral radius is a traction member 23 (in the form of a rope, chain or the like). With rotation of the cam element 19, the said member is rolled on the peripheral surface 22 of said element, travels over a deflecting or reversing pulley 24 and is fixed at its other free end on the objective support 13, in a manner as hereinafter described. Because of the oblique guiding of the objective support 13 carrying the objective 8, which can be seen from FIG. 1, the inherent weight of this structural part, consisting of the components 8 and 13, holds the traction member 23 tensioned; alternatively, a spring member anchored fast to the camera could pretension the objective support 13 against the pulling direction of the traction member 23.

Figure 2:
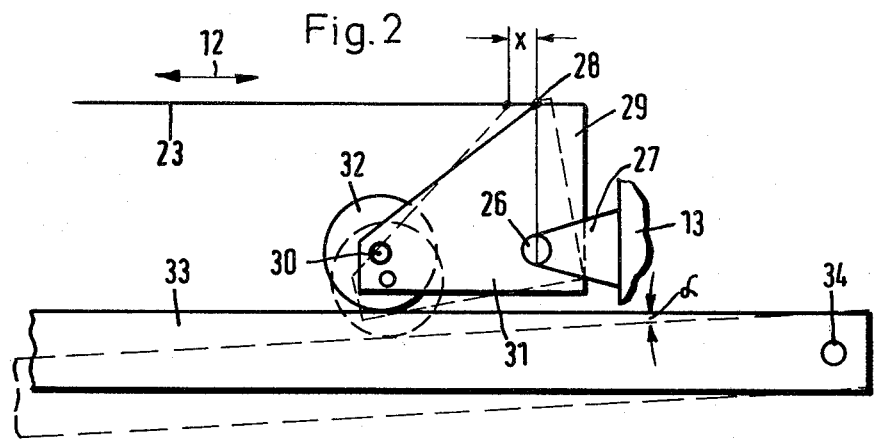
FIG. 2 is an enlarged detail of FIG. 1 for showing the focal length correction.

A bellcrank lever 25 is pivotally mounted on the objective support 13 and about its corner point 26 by means of a leg 27 (FIG. 2). The free end 28 of one of its arms 29 is connected to the traction member 23, while the free end 30 of its other arm 31 carries a pulley 32, which is urged against a guide rail 33 (by the tensile force in the traction member 23 through the bellcrank lever 25).

The guide rail 33 has limited pivotal movement (represented in FIG. 1 by arrow 35) about the pivot bearing 34 which is fast with the camera. The forward end 36 of the guide rail 33 can be secured in any desired position (in a manner which is not shown).

With an adjustment of the guide rail 33 (by pivotal movement about the bearing 34) and as shown in FIG. 2, the effective length of the traction member 23 is altered by the value x, and in fact in a specific ratio with respect to the pivotal angle α.

FIG. 4 illustrates a suitable corrective arrangement for a scale band 37, which is held, rolled up, by spring force on a reel 38 and from which readings can be taken through a viewing window 39 in the housing 1. The guide rail 33' is pivotable, independently of the guide rail 33, about the pivot pin 34', in order to be able to make allowances for geometrical relationships which, with the given construction and in the event of a certain focal length deviation, necessitate another correction of the scale band 37 with respect to the correction of the traction member 23. However, it is also obvious that a common adjustment of the guide rails 33, 33' can be provided, or that one guide rail is sufficient. In other respects, the arrangement of a bellcrank lever 25' with a pulley or roller 32' corresponds to the arrangement as described above.

FIG. 3 illustrates a different type of correction in three different constructional forms. FIGS. 3.1 and 3.2 alter the effective length of the traction member 23. In the case of FIG. 3.1, the deflecting or reversing pulley 24 (FIG. 1) can be shifted in the direction of the arrow 40, i.e. in the direction of both runs of the traction member 23. A threaded spindle 41 with a knurled head 42 serves for this purpose.

In the case of FIG. 3.2, the effective length of the tensioning or traction member is shortened by the fact that a tensioning pulley 44 deflects one of the runs of the traction member 23 in accordance with the arrow 43; a second deflecting pulley 45 can be provided to supplement the action.

Whereas the effective length of the traction member 23 is altered in the case of the two corrective measures as previously described, in accordance with FIG. 3.3 a change at the fixing point 46 (FIG. 1) of the chain 14 on the original table 3 is obtained. Instead of a direct fixing arrangement, in this case a threaded spindle 47 with a knurled head 48 is provided, which makes possible a shifting of the fixing point 46 in the direction of the arrow 47a.

All three corrective means as previously described permit a shifting of the focal plane from the plane 6 of the table 3.

I claim:

1. A reprographic camera comprising a table for the original subject, an objective and an image frame, which are movable relatively to one another in order to produce images or reproductions of an original on a variable scale, one of these structural parts remaining in a fixed position, a first traction member connected to one of said parts for moving said one of said parts, and a second traction member connected to a second one of said parts for moving said second one of said parts, a transmission member coupling the movement of the traction members such that the ratio of the length of their displacements changes gradually throughout their ranges of movement, and a correcting member connected to said second traction member which alters the effective length of the second traction member by an amount which is dependent on the position of said one of said movable structural parts.

2. A camera according to claim 1, having a fixed image frame, and wherein the movement of the objective is coupled to the movement of an adjustable table for the original subject.

3. A reprographic camera comprising a table for the original subject, an objective and an image frame, which are movable relatively to one another in order to produce images or reproductions of an original on a variable scale, one of these structural parts remaining in a fixed position, and the two movable structural parts being coupled to one another by means of a transmission member, which gradually changes the ratio of the lengths of their displacements throughout their ranges of movement, the transmission member comprising a cam element, which is pivotable about its pivot through an angle of rotation which is linearly proportional to the displacement of one of the structural parts and of which the peripheral radius is gradually altered during pivoting between two end points, one end point having anchored thereon a traction member, which is fixed at its other end on the other movable structural part, and is wound on to or off the periphery of the cam element as the latter is pivoted and as a consequence displaces the other movable structural part against a force acting in the opposite direction.

4. A camera according to claim 3, wherein the peripheral radius of the cam element increases gradually from a minimum at one end point up to a maximum at the other end point.

5. A camera according to claim 4, wherein the traction member is anchored at the end point having the minimum peripheral radius.

6. A camera according to claim 3, 4 or 5, wherein the effective length of the traction member is variable.

7. A camera according to any one of claims 3, 4 or 5, wherein the traction member is guided over a deflecting or reversing pulley, which is displaceable parallel to the pulling direction of at least one run of said member.

8. A camera according to any one of claims 3, 4 or 5, wherein the traction member is fixed on the other movable structural part by way of a correcting member, which alters the effective length of the traction member by an amount which is dependent on the position of the said other movable structural part.

9. A reprographic camera comprising a table for the original subject, an objective and an image frame, which are movable relatively to one another in order to produce images or reproductions of an original on a variable scale, one of these structural parts remaining in a fixed position, and the two movable structural parts being coupled to one another by means of a transmission member which gradually changes the ratio of the lengths of their displacements throughout their ranges of movement, the transmission member comprising a cam element, which is pivotable about its pivot through an angle of rotation which is linearly proportional to the displacement of one of the structural parts and of which the peripheral radius is gradually altered during pivoting between two end points, one end point having anchored thereon a traction member, which is fixed at its other end on the other movable structural part, and is wound on to or off the periphery of the cam element as the latter is pivoted and as a consequence displaces the other movable structural part against a force acting in the opposite direction, wherein the traction member is fixed on the other movable structural part by way of a correcting member, which alters the effective length of the traction member by an amount which is dependent on the position of the said other movable structural part, the alteration factor of the correcting member being variable.

10. A camera according to claim 8, wherein the correcting member comprises a bellcrank lever pivotally mounted at one of its corner points on the other movable structural part, one arm of said lever being connected at its free end to the traction member, while its other arm carries at its free end a pulley which runs on a guide rail adjustable with a swivelling action about a shaft fast with the camera with respect to the direction of movement of the other movable structural part.

11. A camera according to claim 8, wherein the end of a scale band indicating the scale of reproduction is fixed by means of a like correcting member on the other movable structural part.

12. A camera according to claim 11, wherein the alteration factors of the two correcting members are variable to different degrees.

13. A reprographic camera comprising a table for the original subject, an objective and an image frame, which are movable relatively to one another in order to produce images or reproductions of an original on a variable scale, one of these structural parts remaining in a fixed position, and the two movable structural parts being coupled to one another by means of a transmission member, which gradually changes the ratio of the lengths of their displacements throughout their ranges of movement, wherein the image frame is fixed and wherein the movement of the objective is coupled to the movement of an adjustable table for the original subject, the transmission member comprising a cam element, which is pivotable about its pivot through an angle of rotation which is linearly proportional to the displacement of one of the structural parts and of which the peripheral radius is gradually altered during pivoting between two end points, one end point having anchored thereon a traction member, which is fixed at its other end on the other movable structural part, and is wound on to or off the periphery of the cam element as the latter is pivoted and as a consequence displaces the other movable structural part against a force acting in the opposite direction.

* * * * *